US012583775B2

(12) United States Patent　　　　(10) Patent No.:　US 12,583,775 B2
Kumar et al.　　　　　　　　　　　(45) Date of Patent:　　Mar. 24, 2026

(54) AUTOMATED PROCESS FOR TREATMENT OF REFINERY WASTEWATER

(71) Applicant: INDIAN OIL CORPORATION LIMITED, Maharashtra (IN)

(72) Inventors: Manoj Kumar, Faridabad (IN);
Srikanth Sandipam, Faridabad (IN);
Ravi Prakash Gupta, Faridabad (IN);
Debasis Bhattacharyya, Faridabad (IN)

(73) Assignee: Indian Oil Corporation Limited (IN)

( * ) Notice: Subject to any disclaimer, the term of this patent is extended or adjusted under 35 U.S.C. 154(b) by 339 days.

(21) Appl. No.: 18/237,205

(22) Filed: Aug. 23, 2023

(65) Prior Publication Data

US 2024/0067544 A1　　Feb. 29, 2024

(30) Foreign Application Priority Data

Aug. 24, 2022　(IN) .............................. 202221048237

(51) Int. Cl.
| | |
|---|---|
| *C02F 3/00* | (2023.01) |
| *C02F 3/10* | (2023.01) |
| *C02F 3/12* | (2023.01) |
| *C02F 101/10* | (2006.01) |
| *C02F 101/16* | (2006.01) |
| *C02F 103/36* | (2006.01) |

(52) U.S. Cl.
CPC .............. *C02F 3/006* (2013.01); *C02F 3/105* (2013.01); *C02F 3/12* (2013.01); *C02F 2101/101* (2013.01); *C02F 2101/16* (2013.01); *C02F 2103/365* (2013.01); *C02F 2209/02* (2013.01); *C02F 2209/05* (2013.01); *C02F 2209/06* (2013.01); *C02F 2209/10* (2013.01);

*C02F 2209/20* (2013.01); *C02F 2209/22* (2013.01); *C02F 2209/42* (2013.01)

(58) Field of Classification Search
CPC ................ C02F 1/722; C02F 2101/101; C02F 2101/16; C02F 2103/365; C02F 2209/005; C02F 2209/02; C02F 2209/04; C02F 2209/05; C02F 2209/06; C02F 2209/10; C02F 2209/14; C02F 2209/16; C02F 2209/18; C02F 2209/20; C02F 2209/22; C02F 2209/36; C02F 2209/42; C02F 2301/046; C02F 3/006; C02F 3/06; C02F 3/101; C02F 3/105; C02F 3/12; C02F 3/1205; C02F 3/348
USPC ....................................................... 210/614
See application file for complete search history.

(56) References Cited

U.S. PATENT DOCUMENTS

| | | |
|---|---|---|
| 5,585,266 A | 12/1996 | Plitt et al. |
| 9,139,457 B2 | 9/2015 | Hatten |

(Continued)

FOREIGN PATENT DOCUMENTS

| | | |
|---|---|---|
| WO | 2013005212 A1 | 1/2013 |
| WO | 2013160779 A1 | 10/2013 |
| WO | 2016015888 A1 | 2/2016 |

*Primary Examiner* — Claire A Norris

(57) ABSTRACT

The present invention relates to a process for refinery wastewater treatment. More particularly, the present invention relates to an automated process for treatment of refinery wastewater. The process of the present invention provides complete automation for controlling different critical parameters that enhance biological activity of activated sludge process (ASP) and helps in significant reduction in sludge recycling that increases the treatment efficiency.

20 Claims, 6 Drawing Sheets

(56)     References Cited

U.S. PATENT DOCUMENTS

| | | |
|---|---|---|
| 10,287,182 B2 | 5/2019 | Ried et al. |
| 2020/0102236 A1* | 4/2020 | Kumar ..................... C02F 3/02 |

\* cited by examiner

AUTOMATED PROCESS FOR TREATMENT OF REFINERY WASTEWATER

FIELD OF THE INVENTION

The present invention relates to a process for refinery wastewater treatment. More particularly, the present invention relates to an automated process for treatment of refinery wastewater. The process of the present invention provides complete automation for controlling different critical parameters which enhances the biological activity of activated sludge process (ASP).

BACKGROUND OF THE INVENTION

Hydrocarbon based wastewater is being produced as a by-product in various processes like desalting, cooling towers, storm water, distillation, or cracking in oil refineries and petrochemical plants. All these processes need water for processing at a scale of 1.5 to 1.8 times of refinery capacity on regular basis. To meet the required water quantity in an operating refinery or petrochemical plant, it is a regular practice to re-use the wastewater after treating in an Effluent Treatment Plant (ETP) by various physico-chemical methods in which the economically recoverable products like hydrocarbons are recovered and the pollutants are treated in biological units by microbial action. The unrecoverable Oil and Grease (O&G) and other organic contaminants are reduced by microbial catabolism in aeration chambers by activated sludge process. The extent of degradation depends on the presence of a required catabolic gene pool, the type and functionality of the microorganisms in the microbial community and their numbers. The majority of the wastewater, biological treatment is done by using the "activated sludge" process. In all activated sludge plants, once the industrial wastewater has received sufficient treatment, an additional step of settling out the biological floc is required. Part of the settled material, the sludge (biomass), is returned to the system to re-seed the new industrial wastewater entering the tank. The remaining sludge then needs to be disposed of. The biological treatment by activated sludge process is often disrupted by seasonal variation and shock load from organic (e.g., chlorinated organic, phenolic compounds, surfactants, and herbicides) and inorganic (e.g., heavy metals, sulfides, and ammonia) chemicals present in the wastewater stream. This disruption of biological processes results in decreased carbon removal and modification of sludge compaction properties. Identifying the shock loads and toxic ingressions in the upfront will save lot of time, energy and efficiency of the refinery ETPs, thus reducing the operational expenditure to large extent.

US 005585266A relates to the design and operation of immobilized cell bioreactor. The document describes an immobilized bioreactor. It does not address the continuous monitoring and auto control of system to handle shock loads.

WO2013/005212A1 relates to a method and system for treating waste material. It describes about the bioreactor operation for wastewater treatment using automated chemostat principle to dose the bacteria. However, the document does not address the continuous monitoring and auto control of system to handle shock loads.

U.S. Pat. No. 9,139,457B2 discloses systems, apparatus and methods that control and manage wastewater collection and treatment. One or more sensors monitor and measure levels of contaminants, other chemicals and or environmental conditions in a well of a collection station and/or in inflow and/or outflow mains. An additive that can include one or more of ozone, oxygen, a bioagent, bleach, peroxide and other chemicals, and selected to treat chemicals and/or contaminants in wastewater, can be mixed with wastewater in the well and the main. A dispersion assembly deployed within the collection station is adapted to mix and spray the wastewater and additive onto a wall of the well or surface of a body of wastewater in the well. A processor configured to control the rate at which the additive is provided to the dispersion assembly or force main based on measurements of contaminants received from the first and second sensors. However, the document fails to disclose an automated process having integrated sensors in the system.

WO2016015888 discloses a method for regulating a water treatment plant (2) having an inlet (3), an ozonation stage (4), a transfer stage (5), at least one biological filter (6) and an outlet (7), comprising the following process steps: measuring a first parameter set in the inlet (3) by means of a UV/Vis sensor (8), wherein, based on the first parameter set, a measurement is determined for a first concentration of micro-contaminants (c1) and/or a nitrite concentration (n1); controlling the ozonation stage (4) such that ozone is supplied at a preselected ratio to the measured first parameter set (c1, n1); measuring a second parameter set in the transfer stage (5) by means of a UV/Vis sensor (9), wherein, based on the second parameter set, a measurement is determined for a second concentration of micro-contaminants (c2); regulating the ozonation such that the quotient of $(c1-c2)/c1$, representing the difference between the first concentration of micro-contaminants (c1) and the second concentration of micro-contaminants (c2) divided by the first concentration of micro-contaminants (c1), adopts a value between a predetermined minimum value and a predetermined maximum value; measuring a third parameter set in the process (7) by means of a UV/Vis sensor (10), wherein, based on the third parameter set, a measurement for a third concentration of micro-contaminants (c3) is determined; if the measurement for the concentration of micro-contaminants (c3) in the process (7) exceeds a predetermined maximum value, increasing the ozone supply.

WO2013160779 discloses a method of maintaining a bioreactor of a waste material treatment system. The method comprises monitoring the condition of bacteria and/or waste material. If the condition satisfies a first set of criteria, bacteria is transferred from a bacterial backup container to the bioreactor. If the condition satisfies a second set of criteria, bacteria is transferred from the bioreactor to the bacterial backup container.

The available studies and reports are based on operation of fixed bed reactors and operation of bioreactors for efficient treatment through improvement in process conditions. But none of the studies discussed regarding integration of automation in the aeration tank and integration of hybrid packed bed reactor in the refinery wastewater treatment system. Further, none of the prior arts discloses a process for surpassing or handling the shock loads and reduction in energy consumption by optimizing the DO content and other critical parameters. Moreover, the existing methods and process describes setting up new reactor designs and change in operational parameters.

Accordingly, the present invention solves the above problems and provides a process which involves integrating automation of different critical parameters to the existing ASP systems along with integration of hybrid packed bed reactor and a final polishing step. Particularly, the present invention provides an automated process for the treatment of refinery wastewater.

SUMMARY OF THE INVENTION

In an aspect of the present invention, there is provided an automated process for treating refinery wastewater capable of surpass or withstanding shock loads, said process comprising steps of:

(i) treating a refinery wastewater in an aeration tank by maintaining the MLSS of 800-1200 ppm, wherein the aeration tank is provided with a hybrid packed bed reactor and means for continuous monitoring and controlling of process parameters selected from the group comprising of pH, TDS/conductivity, dissolved oxygen (DO), total organic carbon (TOC), cell count/mixed liquor suspended solids (MLSS) sludge volume index (SVI), specific oxygen uptake rate (SOUR), electro-chemical, nitrogen & phosphorus, ammonia, temperature, and level sensor;

(ii) continuous monitoring and identification of shock loads and toxic ingressions in the aeration tank;

(iii) providing dosing of active culture from a microbial dosing system connected to an on-site customized microbe generation system;

(iv) polishing of the treated wastewater; and (v) recycling 1-8% of sludge produced to the aeration tank;

wherein the process parameters are controlled through distributed control system (DCS) based integrated system, and wherein an increase in cell voltage and anode potential beyond a threshold value, as identified by electro-chemical sensor, is responded by immediate dispensing/dosing of microbes by a microbial dosing system such that to increase the MLSS to 1200 mg/l-1800 mg/l, and increase in air purging to maintain the dissolved oxygen (DO) to a level of 4-8 ppm, and wherein a decrease in cell voltage and anode potential beyond a threshold value, as identified by electro-chemical sensor, is responded by immediate dispensing/dosing of $H_2O_2$ from the feed tank and microbes by a microbial dosing system such that to oxidize the oxygen scavenging pollutants selected from sulfides and ammonia.

In an embodiment of the present invention, there is provided a process for treating refinery wastewater wherein sludge recycling is ≤5%.

In another embodiment of the present invention, there is provided a process for treating refinery wastewater wherein MLSS in an aeration tank is maintained at 1000 ppm.

In an embodiment of the present invention, there is provided a process for treating refinery wastewater wherein the polishing of the treated wastewater is carried out in last chamber of the hybrid bed reactor having modified super hydrophobic and oleophilic foam/material.

In another embodiment of the present invention, there is provided a process for treating refinery wastewater wherein modified super hydrophobic and oleophilic foam/material is selected from polystyrene, polyurethane, polypropylene, expanded polyethylene and ceramic.

In an embodiment of the present invention, there is provided a process for treating refinery wastewater wherein the means for continuous monitoring of different process parameters are pH sensor, TDS/conductivity sensor, DO sensor, TOC sensor, cell count/MLSS sensor, SVI sensor, SOUR sensor, electrochemical potential sensor, nitrogen & phosphorus sensor, ammonia sensor, temperature sensor and level sensor.

In another embodiment of the present invention, there is provided a process for treating refinery wastewater wherein the pH sensor maintains pH in the range of 6.5-8.5.

In an embodiment of the present invention, there is provided a process for treating refinery wastewater wherein the dissolved oxygen (DO) sensor maintains the dissolved oxygen at 6 ppm.

In another embodiment of the present invention, there is provided a process for treating refinery wastewater, wherein additional sensors are placed with increase in area of chamber wall and at a frequency of 4×3 m².

In an embodiment of the present invention, there is provided a process for treating refinery wastewater wherein said process results in reduced sludge generation and zero liquid discharge.

These and other features, aspects, and advantages of the present subject matter will be better understood with reference to the following description. This summary is provided to introduce a selection of concepts in a simplified form.

BRIEF DESCRIPTION OF DRAWINGS

These and other features, aspects, and advantages of the present invention will become better understood when the following detailed description is read with reference to the accompanying drawings in which like characters represent like parts throughout the drawings wherein.

ABBREVIATIONS

Figure 1:
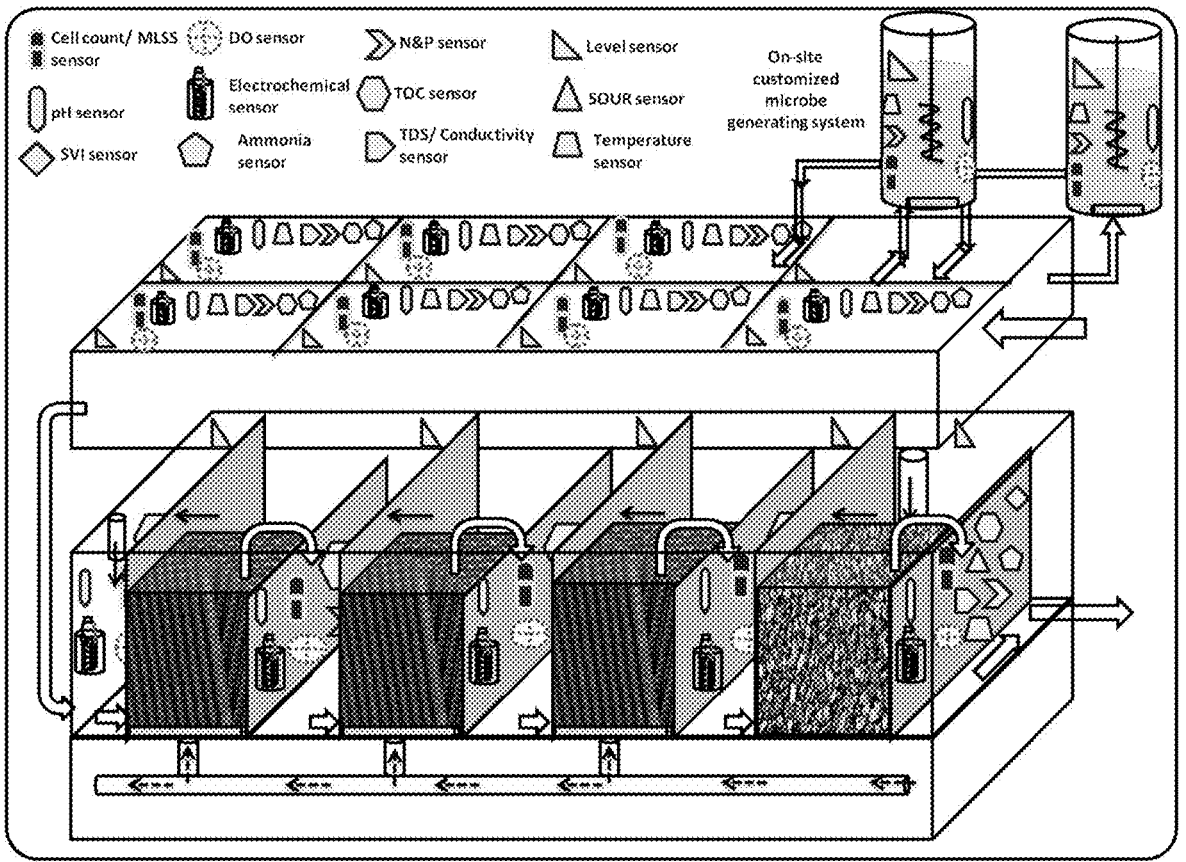
FIG. 1 illustrates schematic of compact hybrid packed bed bioreactor.
Figure 2:
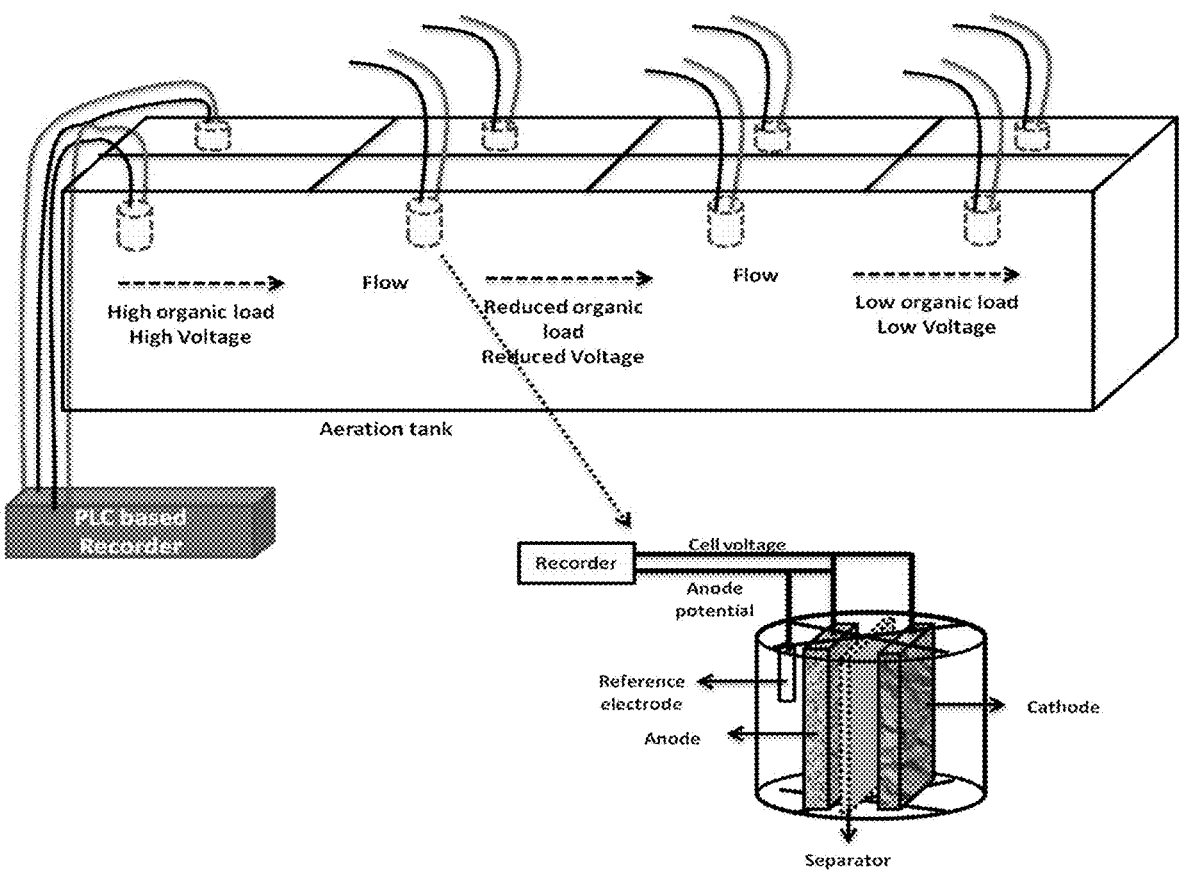
FIG. 2 illustrates arrangement of electrochemical cell for cell voltage and anode potential monitoring.

DO: Dissolved oxygen
SOUR: Specific oxygen uptake rate
MLSS: Mixed liquor suspended solids
VSS: Volatile suspended solids
SVI: Sludge volume index
TOC: Total organic carbon
DCS: Distributed control system
ASP: Activated Sludge Process
HRT—Hydraulic Retention Time
ETP—Effluent Treatment Plant

DETAILED DESCRIPTION OF THE INVENTION

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

Definition

For the purposes of this invention, the following terms will have the meaning as specified therein:

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to" "including" and "including but not limited to" are used interchangeably.

The present invention provides a fully automated process for wastewater treatment. It relates to integrating the automation of different critical parameters to the Activated Sludge Process (ASP) system along with integration of hybrid packed bed reactor and a final polishing step. It helps in reducing the input energy in terms of air purging due to optimization of parameters. The use of on-site customized microbe generation system in the present invention helps in low quantity of sludge recirculation yet maintaining efficient treatment through dosing of active culture as and when required. Further, it helps in increasing the effluent quality in reduced retention time and increases the water recyclability. The present invention mainly targets the sustained operation of biological section of effluent treatment plant (ETP) for effective and faster removal of emulsified oil content, total solids (TS), ammonia and chemical oxygen demand (COD) as well as biological oxygen demand (BOD) of the wastewater. It helps in easy surpassing of shock loads of various contaminants of refinery wastewater by continuous monitoring and auto controlling of biological activity. The process is highly effective in uninterrupted and sustained operation of ASP unit. It is also effective in surpassing or withstanding the shock loads as well as reducing the HRT for efficient treatment unlike the prior art. The present invention enables controlling of different critical parameters of ASP online and through integration of the hybrid packed bed reactor and therefore, higher treatment efficiency is achieved. Due to the optimization of parameters, the requirement of air spurging and chemical dosing is significantly reduced; that saves large portion of energy and cost input. Further, the process utilizes on-site customized microbe generation system and helps in low quantity of sludge recirculation yet maintaining efficient treatment through active culture. This results in low bio-sludge generation. Overall, the present invention helps in transformation of existing ETP units towards zero liquid discharge and independent or less dependent of the freshwater requirement.

Specifically, the process of the present invention takes place in a step-wise approach. Initially, wastewater comes to an aeration tank, where all the desired sensors and controllers are connected through DCS. Based on the strength and complexity of wastewater, dosing of microbes (based on MLSS), air (based on DO), $H_2O_2$ (based on sulphides, ammonia), etc., is carried out automatically. The effluent of aeration tank enters into the hybrid packed bed reactor, where it passes through different chambers of reactor for removal of different pollutants. In each chamber of the hybrid reactor, all the parameters will be monitored and required additional dosing is carried out. Finally, the effluent reaches the polishing chamber, where the residual oil, if any, will be separated through adsorption on to the super hydrophobic and/or oleophilic material, which is further degraded by microbes. The process helps in sustained and uninterrupted operation of ASP and helps in achieving significantly higher treatment efficiency at lower HRT and further, also increases the water recyclability. The present invention mainly targets the sustained operation of biological sections of effluent treatment plant (ETP) for effective and faster removal of emulsified oil content, total solids (TS), ammonia and chemical oxygen demand (COD) as well as biological oxygen demand (BOD) of the wastewater. The process helps in easy surpassing of shock loads of various contaminants of refinery wastewater by continuous monitoring and auto controlling of the biological activity.

Thus, in accordance with the present invention, there is provided an automated process for treating refinery wastewater capable of surpass or withstanding shock loads, said process comprising steps of:

(i) treating a refinery wastewater in an aeration tank by maintaining the MLSS of 800-1200 ppm, wherein the aeration tank is provided with a hybrid packed bed reactor and means for continuous monitoring and controlling of process parameters selected from the group comprising of pH, TDS/conductivity, dissolved oxygen (DO), total organic carbon (TOC), cell count/mixed liquor suspended solids (MLSS), sludge volume index (SVI), specific oxygen uptake rate (SOUR), electrochemical, nitrogen and phosphorus, ammonia, temperature, and level sensor;

(ii) continuous monitoring and identification of shock loads and toxic ingressions in the aeration tank;

(iii) providing dosing of active culture from a microbial dosing system connected to an on-site customized microbe generation system;

(iv) polishing of the treated wastewater; and (v) recycling 1-8% of sludge produced to the aeration tank;

wherein the process parameters are controlled through distributed control system (DCS) based integrated system, and wherein an increase in cell voltage and anode potential beyond a threshold value, as identified by electrochemical sensor, is responded by immediate dispensing/dosing of microbes by a microbial dosing system such that to increase the MLSS to 1200 mg/l-1800 mg/l, and increase in air purging to maintain the dissolved oxygen (DO) to a level of 4-8 ppm, and wherein a decrease in cell voltage and anode potential beyond a threshold value, as identified by electrochemical sensor, is responded by immediate dispensing/dosing of $H_2O_2$ from the feed tank and microbes by a microbial dosing system such that to oxidize the oxygen scavenging pollutants selected from sulfides and ammonia.

In the process of the present invention, there is an integration of aeration tank with compact hybrid packed bed bioreactor. This works as a standalone system and/or also can retrofit to the existing aeration basin after few modifications. The hybrid packed bed reactor described herein is 4-6 inter-connected chambers that allows plug flow mode of operation. All chambers except the last chamber is of similar design i.e., each chamber is constructed in hybrid mode as two parts, i.e., 75% of the chamber is packed bed type and 25% is of stirred tank type.

Packed Bed Reactor

The Packed Bed is constructed using foam material that includes but not limited to polystyrene, polyurethane, polypropylene and expanded polyethylene. The foam is arranged in corrugated layers to enhance the surface area and allow maximum liquid flow. The modified corrugated foam sheets to be placed in packed bed area in such a way that the liquid flows to upward cross sectional through bed. The voidage of the corrugated foam to be maintained at least 0.8 in the packed bed area.

Last chamber of Packed Bed Reactor: The last chamber of the packed bed reactor is constructed using modified super hydrophobic and/or oleophilic material. The construction is as follows:

The base of the media used in packed bed is made up of super hydrophobic and/or oleophilic foam includes but not limited to polystyrene, polyurethane, polypropylene, expanded polyethylene and ceramic. This super hydrophobic and/or oleophilic foam is modified in a step wise manner. Initially the selected foam is soaked in 15% hydrogen peroxide ($H_2O_2$) for one hour followed by washing with water. The washed foam is soaked again in media containing mixture of 5% organic silicone and 2% powdered conductive material in water for 2 hours. The organic silicone may include polydimethylsiloxane or polymethylhydrosiloxane, while the powdered conductive material includes but not limited to powdered activated carbon, graphite powder, graphene and carbon nanotubes. The modified super hydrophobic and/or oleophilic foam is arranged in corrugated layers to enhance the surface area and allow maximum liquid flow. The modified corrugated super hydrophobic and/or oleophilic foam sheets to be placed in packed bed area in such a way that the liquid flows to upward cross sectional through bed. Further, the last chamber of packed bed reactor made up of modified corrugated plates that can be an integrated part of packed bed reactor or can be a standalone option to fit into existing ETPs.

Stirred Tank Area

The stirred tank area is equipped with different sensors and controllers to control pH, conductivity, DO, TOC, cell count/MLSS, SVI, SOUR, nitrogen and phosphorus, ammonia and level sensors. Air flow is arranged from bottom of packed bed in each chamber through spargers. An electrochemical cell is also placed in the stirred tank area for continuous monitoring of cell voltage and anode potential. The electrochemical cell is constructed in an open-ended cylinder for liquid passage through it and equipped with two electrodes separated by conductive separator. The cylinder of the electrochemical cell is made up of any non-conducting material like acrylic, polypropylene, teflon, etc. There should be non-conductive arrangement on both sides of cylinder to hold the electrodes. The two electrodes of electrochemical cell are different from each other. One electrode act as anode which is of rectangular stainless steel mesh pouch filled with carbon felt. The other electrode acts as cathode which is of rectangular titanium mesh. The cathode surface area is at least 0.2% higher than anode surface area. The separator between both the electrodes is of ion conductive in nature that includes but not limited to non-woven cloth, ceramic sheet, glass wool sheet, and cation exchange membrane. Prior to use, the ion selective sheet is to be treated in a step-wise manner to activate the ion exchange property. Initially, the sheet to be treated with 30% $H_2O_2$ followed by washing with water, treatment with 0.5% $H_2SO_4$ and final wash with water. All the treatment is carried out at 70-80° C. A reference electrode is placed near the anode electrode to measure the anode potential. Electrical circuit connections are made to the recorder in such way that both cell voltage and anode potential can be monitored simultaneously.

The electrochemical cell is connected to the alarm system to regulate the input feed quantity through monitoring the cell voltage and anode potential. After starting up the treatment, the cell voltage and anode potential gradually increases before stabilizing. The cell voltage and anode potential reduced as the wastewater moves to next chamber because of the reduced carbon availability. However, the cell voltage and anode potential of each chamber is stabilized between particular range. This is dependent on the strength of wastewater and reduces as the chamber increases. Further, the increment in cell voltage and anode potential indicates the increment in TOC of the wastewater above the design limit.

The reduction in cell voltage and anode potential indicates the shock load or ingression of toxic components that disturbs the performance of reactor.

In another embodiment of the present invention, there is provided a process for treating refinery wastewater, wherein sludge recycling is ≤5%. In a preferred embodiment of the present invention, the sludge recycling is ≈3%.

In yet another embodiment of the present invention, there is provided a process for treating refinery wastewater, wherein MLSS in an aeration tank is maintained at 1000 ppm.

In still another embodiment of the present invention, there is provided a process for treating refinery wastewater, wherein the polishing of the treated wastewater is carried out in last chamber of the hybrid bed reactor having modified super hydrophobic and oleophilic foam/material. In the present invention, the last chamber of the packed bed reactor is specialized for polishing step where the residual oil, if any, will be adsorbed by the modified super hydrophobic and/or oleophilic material, which further degraded by the microbes. This results in substantial removal of oil content from the effluent and the existing additional polishing steps can be avoided.

In a preferred embodiment of the present invention, there is provided a process for treating refinery wastewater, wherein modified super hydrophobic and oleophilic foam/material is selected from polystyrene, polyurethane, polypropylene, expanded polyethylene and ceramic.

In another embodiment of the present invention, there is provided a process for treating refinery wastewater, wherein the means for continuous monitoring of different process parameters are pH sensor, TDS/conductivity sensor, DO sensor, TOC sensor, cell count/MLSS sensor, SVI sensor, SOUR sensor, electrochemical potential sensor, nitrogen & phosphorus sensor, ammonia sensor, temperature sensor and level sensor.

In the process of present invention, the controllers and sensors connected to aeration tank facilitate the dosing different additives to meet the desired value.

The pH sensor is connected to controller to maintain the pH in the range of 6.5-8.5 and automatic dosing of acid and base as and when required.

The conductivity sensor monitors the conductivity of feed and helps in optimizing the chemical dosages, thus increasing the water recyclability.

The DO sensor is connected to controller to maintain the DO in the range of 5-6 ppm through regulating the air purging.

The specific oxygen uptake rate (SOUR) indicates the specific biological activity of microbes based on oxygen consumption per unit of volatile suspended solids (VSS). The SOUR sensor is connected to air sparger and works in association with DO sensor to maintain the active/young culture in the bioreactor.

The cell count/MLSS sensor connected to customized microbe growth system for microbe dosing to maintain the MLSS around 1000 mg/l, under normal circumstances and up to 1500 mg/l during shock loads.

The SVI sensor monitors the biological activity of reactor which should be in the range of 180-220 ml/g.

The sludge recirculation in the aeration tank is kept at ≤5% to encourage the activity of active bacteria that is dosed from the customized microbe growth system to maintain the MLSS and SVI.

The nitrogen phosphorus sensor connected to urea and DAP tanks to maintain the nitrogen and phosphorus content against carbon content (C:N:P) in the range between 100:10:1 and 100:5:1. This sensor work in coordination with TOC sensor to maintain the desired ration of C, N and P in the compact reactor.

The ammonia sensor is connected to $H_2O_2$ dosing tank to regulate the inlet ammonia concentration in the design range.

The level sensor connected to antifoaming agent and as soon as the level raises, triggers the dosing of antifoaming agent.

Accordingly, in an embodiment of the present invention there is provided a process, wherein the pH sensor maintains pH in the range of 6.5-8.5.

In another embodiment of the present invention, there is provided a process, wherein the dissolved oxygen (DO) sensor maintains the dissolved oxygen at 6 ppm.

Figure 3:
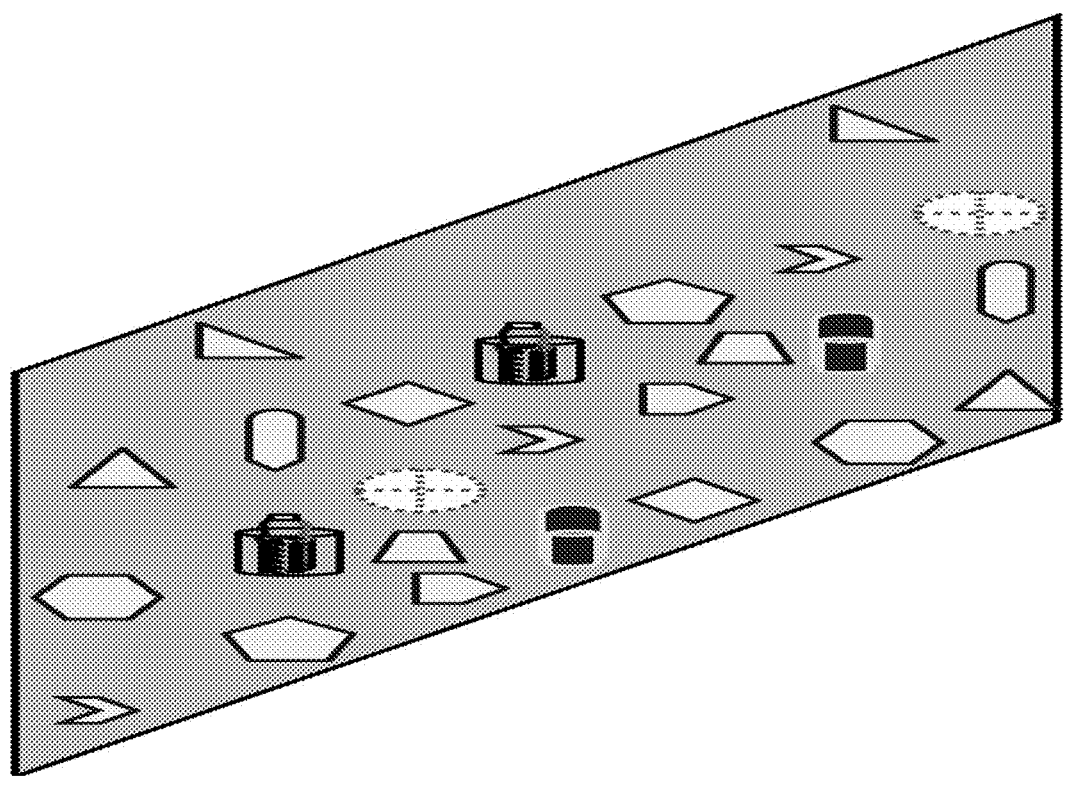
FIG. 3 illustrates arrangement of sensors on the chamber separator.
Figure 4:
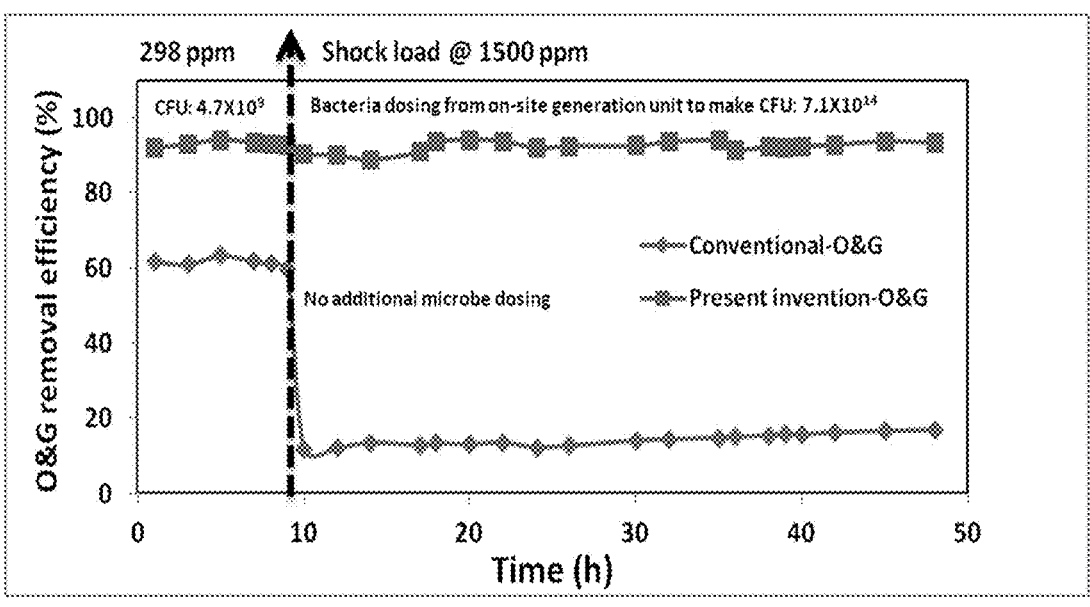
FIG. 4 illustrates change in behavior of system after shock load of O&G in conventional ASP and present invention.
Figure 5:
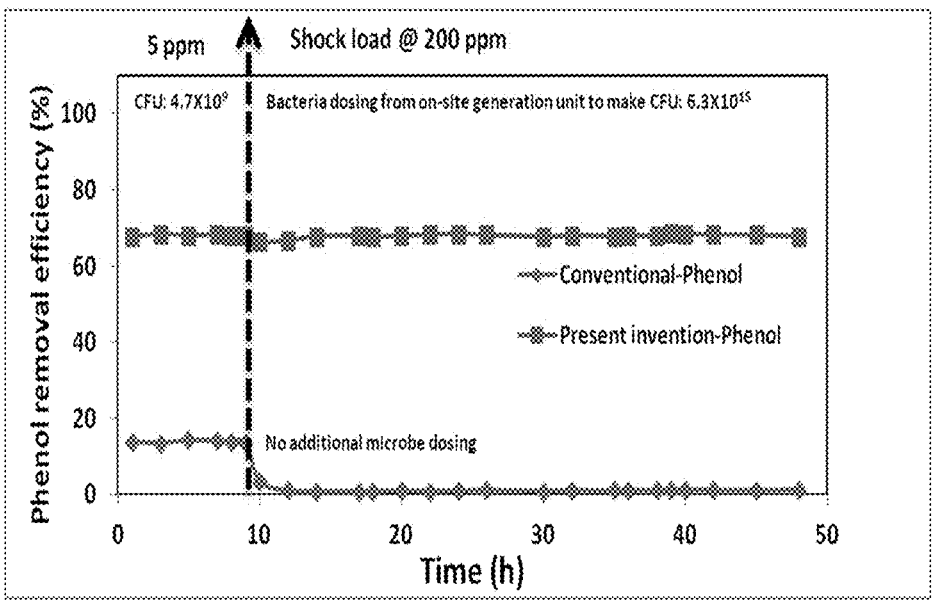
FIG. 5 illustrates change in behavior of system after shock load of phenol in conventional ASP and present invention.
Figure 6:
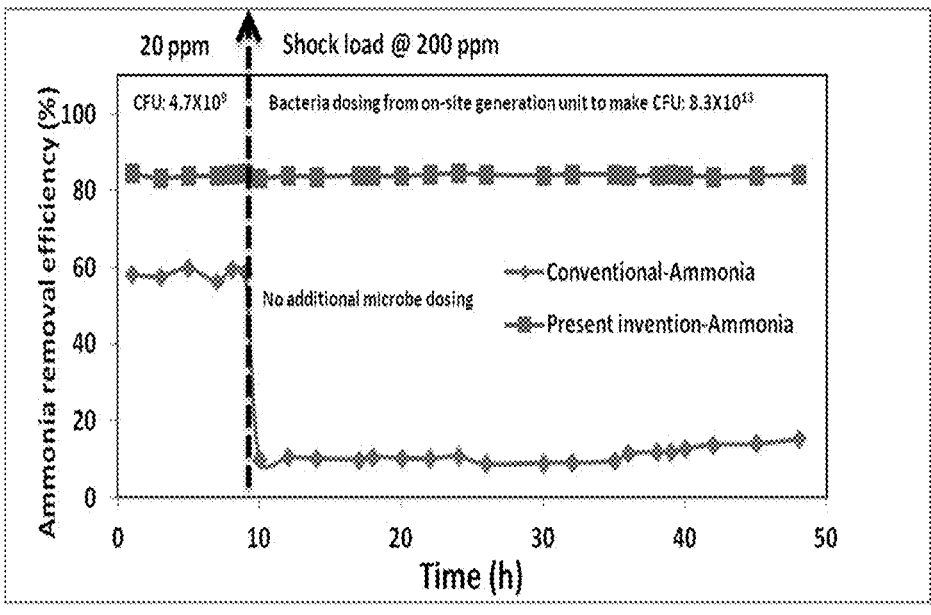
FIG. 6 illustrates change in behavior of system after shock load of ammonia in conventional ASP and present invention.
Figure 7:
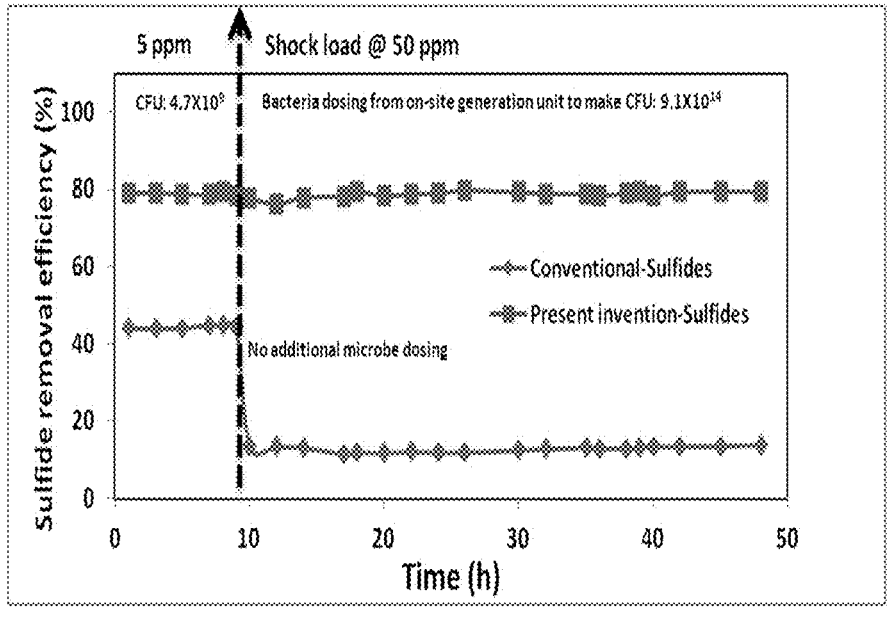
FIG. 7 illustrates change in behavior of system after shock load of sulfide in conventional ASP and present invention.

In still another embodiment of the present invention, there is provided a process wherein additional sensors are placed with increase in area of chamber wall and at a frequency of $4{\times}3$ m$^2$. Particularly, if the length of the wall is more than 4 meters, a second set of sensors placed in the chamber and an average/cumulative value is considered. Similarly, if the depth of the chamber is more than 3 meters, a second set of sensors is to be placed. In both the cases, the additional set of sensors arranged in zig zag manner with at least 2 meters distance between two same sensors. The typical schematic of the sensor arrangement is given in FIG. 3.

In yet another embodiment of the present invention, there is provided a process for treating refinery wastewater, wherein the process results in reduced sludge generation and zero liquid discharge The process of the present invention results in reduced retention time due to faster and efficient treatment and thus increasing the design limits of existing systems. It allows continuous monitoring and maintenance of biological health leading to consistency in treatment efficiency. Further, the process effectively handles the shock loads of all major components O&G, ammonia, phenols, sulfides, etc., due to auto control option. The process also reduces the energy requirement in terms of air purging due to optimized air supply. Furthermore, it helps in significant reduction in sludge recycling (≤5%) that increase the design capacity of existing aeration tank and increase the treatment efficiency. Moreover, the process results in reduced biosludge generation due to operation at low MLSS and use of young/active culture. Therefore, the process provides a possibility of achieving the quality of treated effluent significantly lower than conventional system. Also, it results in increased water recyclability and reduced freshwater requirement and can be easily adapted to the existing ETP units.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods, the exemplary methods, devices and materials are described herein. It is to be understood that this disclosure is not limited to particular methods, and experimental conditions described, as such methods and conditions may vary.

Example 1: Process of Present Invention Against the Conventional Activated Sludge Process (ASP)

The experiment was carried out using both refinery and petrochemical wastewater which are having composition as described in Table 1.

TABLE 1

| Characteristics of refinery and petrochemical wastewater | | |
| --- | --- | --- |
| Parameter | Refinery wastewater | Petrochemical wastewater |
| pH | 7.9 | 7.36 |
| TDS (g/l) | 1720 | 1750 |
| Alkalinity (ppm) | 140 | 260 |
| Ammonia (ppm) | 19.84 | 15.79 |
| Sulfides (ppm) | 2.98 | 1.56 |
| O&G (ppm) | 298 | 127 |
| Phenol (ppm) | 3.46 | 4.11 |
| TOC (ppm) | 96.8 | 75.3 |
| COD (ppm) | 384 | 256 |

The performance of the present invention has been studied against the conventional activated sludge process using both refinery and petrochemical wastewater. Experiment was carried out at 5 L/hour flow rate based continuous operation at ambient conditions. MLSS was maintained at 3200 ppm through sludge 25% recycling for the conventional ASP system, while it was maintained at 1000 ppm for present invention with 3% sludge recirculation. The SVI calculated was found to be 102 ml/g for conventional ASP, while it was 196 ml/g for the present invention. The results obtained from the study are depicted in Table 2.

TABLE 2

Consolidated results obtained from the comparative study of present invention against
conventional activated sludge process using refinery and petrochemical wastewater

| Parameter | Refinery wastewater Inlet | Conventional ASP | Present invention | Petrochemical wastewater Inlet | Conventional ASP | Present invention |
|---|---|---|---|---|---|---|
| Operation mode | N/A | Continuous | Continuous | N/A | Continuous | Continuous |
| HRT (h) | N/A | 18 | 8 | N/A | 18 | 10 |
| pH | 7.9 | 8.1 | 7.4 | 7.36 | 7.8 | 7.1 |
| TDS (g/l) | 1720 | 1710 | 1670 | 1750 | 1720 | 1710 |
| Alkalinity (ppm) | 140 | 82 | 24 | 260 | 185 | 96 |
| Ammonia (ppm) | 19.84 | 2.31 | 0.27 | 15.79 | 0.67 | 0.007 |
| Sulfides (ppm) | 2.98 | 0.41 | 0.002 | 1.56 | 0.12 | 0.003 |
| O&G (ppm) | 298 | 93 | 21 | 127 | 46 | 8 |
| Phenol (ppm) | 3.46 | 0.31 | 0.007 | 4.11 | 0.52 | 0.02 |
| TOC (ppm) | 96.8 | 41.3 | 8.2 | 75.3 | 42.5 | 9.1 |
| COD (ppm) | 384 | 107 | 29 | 256 | 128 | 32 |

The results obtained from the study clearly indicate that the process of present invention results in an efficient and faster treatment of both refinery and petrochemical wastewater at significantly low HRT compared to the conventional Activated Sludge Process. Further, the MLSS was also maintained at 3200 ppm through 25% sludge recycling for the conventional ASP system, while it was maintained at 1000 ppm for present invention with 3% sludge recirculation. Results obtained from the study are depicted in Table 3.

TABLE 3

Consolidated results of different reactor operation using refinery wastewater

| Parameter | Inlet | Conventional ASP | R1 unit alone | Series of hybrid packed bed reactors (R2-R7) without R1 | Present invention (R1 followed by R2-R7 and Rn) |
|---|---|---|---|---|---|
| Operation mode | N/A | Continuous | Continuous | Continuous | Continuous |
| HRT (h) | N/A | 18 | 18 | 12 | 8 |
| pH | 7.9 | 8.1 | 7.9 | 7.81 | 7.4 |
| TDS (g/l) | 1720 | 1710 | 1680 | 1630 | 1670 |
| Alkalinity (ppm) | 140 | 82 | 77 | 51 | 24 |
| Ammonia (ppm) | 19.84 | 2.31 | 2.27 | 1.82 | 0.27 |
| Sulfides (ppm) | 2.98 | 0.41 | 0.38 | 0.21 | 0.002 |
| O&G (ppm) | 298 | 4.8 | 4.1 | 3.6 | 2.1 |
| Phenol (ppm) | 3.46 | 0.31 | 0.29 | 0.26 | 0.007 |
| TOC (ppm) | 96.8 | 41.3 | 41.2 | 28.7 | 8.2 |
| COD (ppm) | 384 | 107 | 106 | 87 | 29 | significantly low, and the high SVI indicates the presence of active/young culture in the present invention that enhanced the treatment efficiency. This also results in bio-sludge reduction due to maintenance of low MLSS as well as causes no sludge recirculation.

Example 2: Evaluating the Performance of Each Unit of the Present Invention

The experiment was carried out using refinery wastewater having composition as described in Table 1. The performance of each chamber of the present invention has been studied against conventional ASP unit using refinery wastewater. Experiment was carried out at 5 L/h flow rate based continuous operation at ambient conditions. MLSS was The results showed a clear functional variation among different chambers of the present invention. Further, a substantial reduction in the HRT was observed by including the hybrid packed bed reactor as well as the polishing chamber.

Example 3: Identification of Volume Ratio Between R1 and R2-R7 Based on HRT

The experiment was carried out using refinery wastewater having composition as described in Table 1. The volume ration between R1 (ASP unit) and R2-R7 chambers (Hybrid packed bed reactor) was established based on HRT. For this, the volume of R2-R7 chambers (Hybrid packed bed reactor) varied at 2, 4 and 6 times to the R1 unit, keeping all other conditions same. The effluent from R1 unit used as inlet feed for all the variations. Experiment was carried out at 5 L/hour flow rate based continuous operation at ambient conditions. MLSS was maintained at 1000 ppm with 3% sludge recirculation. The results obtained from the study are depicted in Table 4.

TABLE 4

| | | Volume ratio between R1 and R2-R7 based on HRT | | |
|---|---|---|---|---|
| Parameter | Inlet | Treated effluent after R1 unit (Inlet for R2-R7) | R2-R7 @ 2 times of R1 | R2-R7 @ 4 times of R1 | Present invention (R2-R7 @ 6 times of R1) |
|---|---|---|---|---|---|
| Operation mode | N/A | Continuous | Continuous | Continuous | Continuous |
| HRT (h) | N/A | 2 | 2 | 4 | 6 |
| pH | 7.9 | 7.8 | 7.91 | 7.78 | 7.4 |
| TDS (g/l) | 1720 | 1710 | 1700 | 1680 | 1670 |
| Alkalinity (ppm) | 140 | 122 | 109 | 97 | 24 |
| Ammonia (ppm) | 19.84 | 15.73 | 12.73 | 8.19 | 0.27 |
| Sulfides (ppm) | 2.98 | 2.23 | 1.84 | 0.87 | 0.002 |
| O&G (ppm) | 298 | 229 | 128 | 27 | 2.1 |
| Phenol (ppm) | 3.46 | 3.31 | 2.08 | 0.96 | 0.007 |
| TOC (ppm) | 96.8 | 91.6 | 49.7 | 21.3 | 8.2 |
| COD (ppm) | 384 | 317 | 137 | 91 | 29 |

The results indicates that by keeping the volume of hybrid packed bed reactor (R2-R7 chambers), significant improvement in treatment can be obtained at less HRT.

Example 4: Identification of Ratio of Fixed Bed Vs Suspended Media in Hybrid Packed Bed Reactor Chambers The experiment was carried out using refinery wastewater having composition as described in Table 1. The ratio of fixed bed against suspended media was studied from 25% fixed bed to 100% fixed bed and compared to the performance of hybrid packed bed reactor. For this, the fixed bed volume was varied between 25% and 100% balancing the remaining volume with suspended media. Experiment was carried out at 5 L/hour flow rate based continuous operation at ambient conditions. MLSS was maintained at 1000 ppm with 3% sludge recirculation. The results obtained from the study are depicted in Table 5.

The results indicate that by keeping the fixed bed volume to 75% in each chamber of hybrid packed bed reactor (R2-R7 chambers), significant improvement in treatment is obtained at less HRT. Further, increasing the volume of suspended media has shown lower treatment efficiency in the packed bed reactor.

Example 5: Evaluating the Shock Load

The shock load check experiment was carried out using refinery wastewater having composition as described in Table 1. High organic load as well as phenol, ammonia and sulfide content disturb the performance of treatment by severely effecting the microbial activities and in turn results in low treatment efficiency. Dosing of microbes to increase the CFU count as per the contaminant load from on-site microbe generation system helps to the most extent in such situations. However, conventional system doesn't have this facility. During continuous operation of both conventional ASP and present invention, shock loads of O&G (1500 ppm), phenol (200 ppm), ammonia (200 ppm) and sulfides (50 ppm) was given to the system. As soon as the sensor

TABLE 5

| | | Ratio of fixed bed vs suspended media in hybrid packed bed (R2-R7) | | | | |
|---|---|---|---|---|---|---|
| Parameter | Inlet | Treated effluent after R1 unit (Inlet for R2-R7) | 100% Fixed bed in R2-R7 | 25% Fixed bed and 75% suspended media in R2-R7 | 50% Fixed bed and 50% suspended media in R2-R7 | Present invention (75% Fixed bed and 25% suspended media in R2-R7) |
|---|---|---|---|---|---|---|
| Operation mode | N/A | Continuous | Continuous | Continuous | Continuous | Continuous |
| HRT (h) | N/A | 2 | 6 | 6 | 6 | 6 |
| pH | 7.9 | 7.8 | 7.4 | 7.62 | 7.81 | 7.4 |
| TDS (g/l) | 1720 | 1710 | 1690 | 1650 | 1630 | 1670 |
| Alkalinity (ppm) | 140 | 122 | 97 | 101 | 53 | 24 |
| Ammonia (ppm) | 19.84 | 15.73 | 9.36 | 11.98 | 5.82 | 0.27 |
| Sulfides (ppm) | 2.98 | 2.23 | 1.84 | 1.82 | 0.18 | 0.002 |
| O&G (ppm) | 298 | 229 | 137 | 146 | 29 | 2.1 |
| Phenol (ppm) | 3.46 | 3.31 | 1.43 | 2.38 | 0.81 | 0.007 |
| TOC (ppm) | 96.8 | 91.6 | 40.4 | 43.1 | 29.1 | 8.2 |
| COD (ppm) | 384 | 317 | 157 | 152 | 89 | 29 | gave alarm, action was taken in the system of present invention, while the conventional ASP was operated as it is. The results obtained from this study are presented in FIG. 4-7. As immediate action taken in the present invention, there is only a marginal disturbance in the treatment efficiency. However, in conventional ASP system, the treatment efficiency was significantly reduced. In case of ammonia and sulfide shock, automatic $H_2O_2$ dosing helped in immediate reduction of ammonia and sulfide content. In case of O&G and phenol shock load, active microbes from customized microbe growth system were dosed to maintain the MLSS and SVI which has completely protected the system from collapse, which was not the case of conventional ASP.

Example 6: Electrochemical Monitoring

Figure 8:
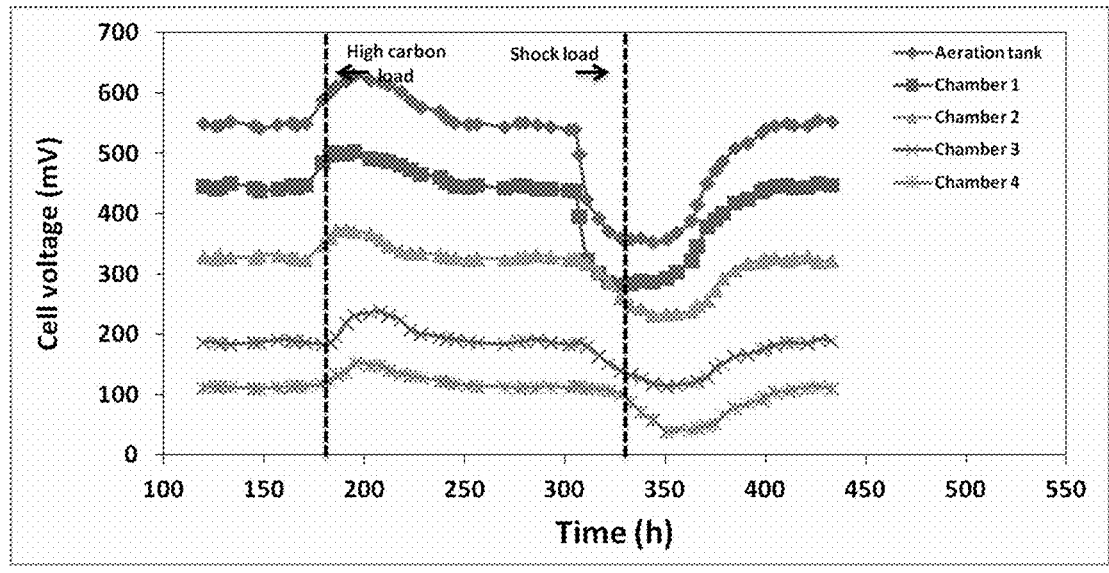
FIG. 8 illustrates change in cell voltage with respect to high carbon load and shock load.
Figure 9:
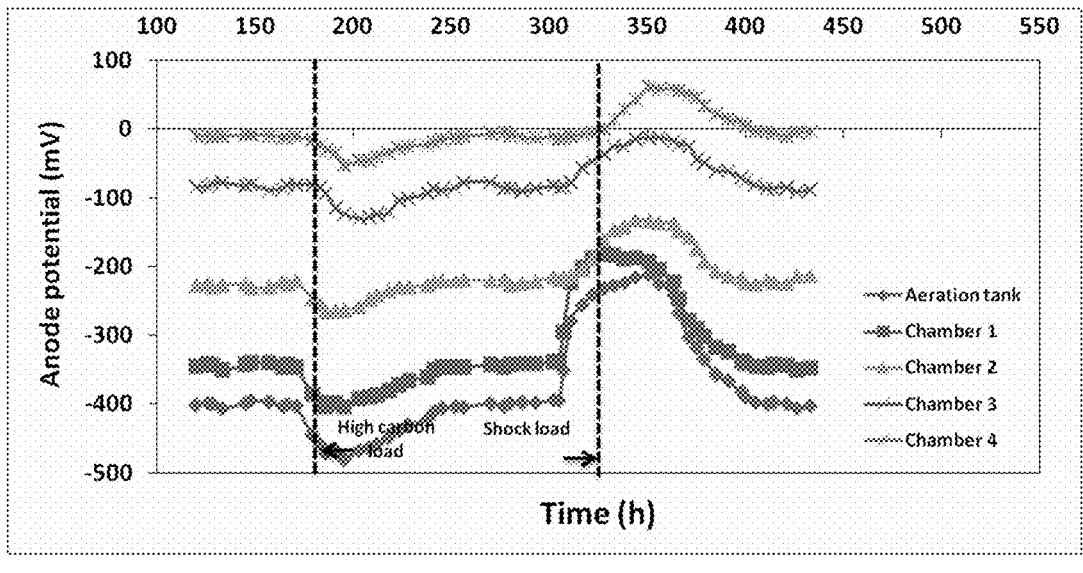
FIG. 9 illustrates change in anode potential with respect to high carbon load and shock load.
Figure 10:
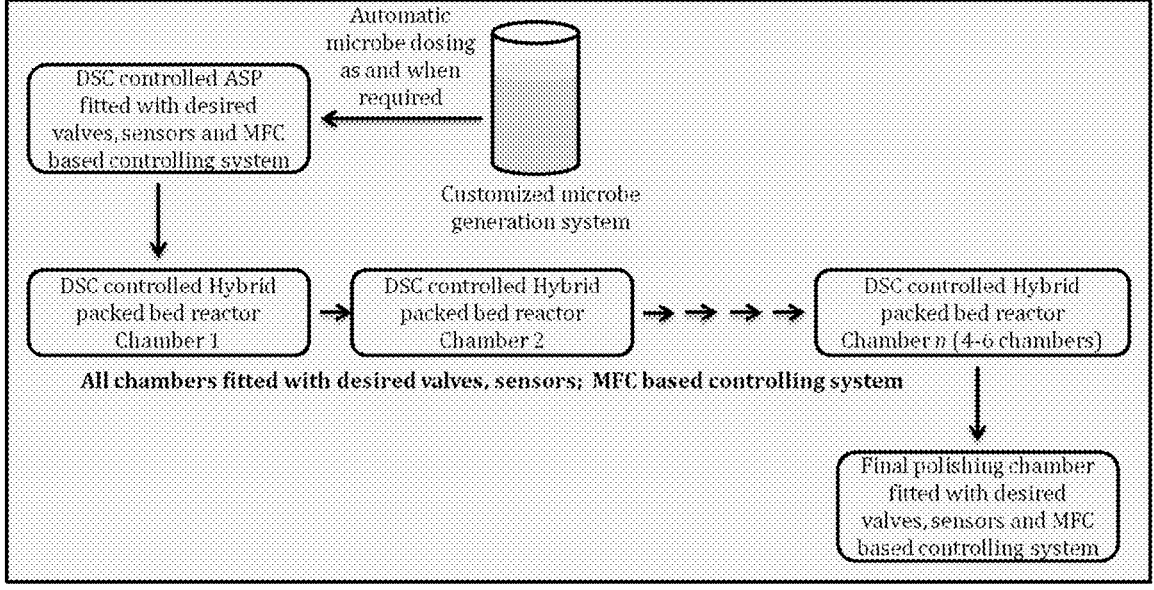
FIG. 10 illustrates a flow chart depicting the process of the present invention.

The experiment was carried out using refinery wastewater having composition as described in Table 1. During continuous operation of both conventional ASP and present invention, sudden increment in the carbon load was carried out by increasing the O&G and phenol content. After about 120 hours of operation using refinery wastewater, stable cell voltage and anode potential was obtained in all chambers. But as soon as the TOC increased from 96.8 to 182.4 ppm, the cell voltage and anode potential increased significantly. Immediately after voltage increment, microbe dosing from customized microbial growth system was initiated to increase the MLSS to 1500 mg/l and also air purging increased to maintain the DO to 6 ppm, which brought back the cell voltage and anode potential to again normal value. Further, a shock load of ammonia and sulfide was given to the system which resulted in sudden drop in cell voltage and anode potential. Immediately, the $H_2O$ dosing was started in the feed tank and microbe dosing from customized microbial growth system was also initiated to retrieve the system performance (FIG. 8-9). This facility is not available in the conventional ASP system.

We claim:
1. An automated process for treating refinery wastewater, the process capable of surpassing, or withstanding shock loads, the process comprising:
   (i) treating the refinery wastewater in an aeration tank having a mixed liquor suspended solids (MLSS) in a range of 800-1200 ppm, wherein the aeration tank is provided with a first set of sensors comprising a pH sensor, a TDS/conductivity sensor, a dissolved oxygen (DO) sensor, a total organic carbon (TOC) sensor, a cell count or an MLSS sensor, a sludge volume index (SVI) sensor, a specific oxygen uptake rate (SOUR) sensor, an electrochemical sensor, a nitrogen and phosphorus sensor, an ammonia sensor, a temperature sensor, and a level sensor, wherein the electrochemical sensor is configured to monitor a cell voltage and an anode potential of an electrochemical cell, wherein the aeration tank is connected to a hybrid packed bed reactor, and wherein the hybrid packed bed reactor has a plurality of chambers;
   (ii) monitoring and identifying shock loads and toxic ingressions in the aeration tank continuously;
   (iii) dosing an active culture of microbes from a microbial dosing system connected to an on-site customized microbe generation system to obtain treated water, and sludge;
   (iv) polishing the treated wastewater; and
   (v) recycling 1-8% of the sludge produced in the hybrid packed bed reactor to the aeration tank;

wherein the process parameters are controlled through a distributed control system (DCS) based integrated system, and
   wherein an increase in the cell voltage and the anode potential beyond a threshold value, as identified by the electrochemical sensor, is responded by immediate dispensing/dosing of the active culture of microbes by the microbial dosing system to increase the MLSS in each of the plurality of chambers of the hybrid packed bed reactor to 1200 mg/l-1800 mg/l, and by increasing air purging to maintain the dissolved oxygen (DO) to a level of 4-8 ppm, and wherein a decrease in the cell voltage and the anode potential beyond the threshold value, as identified by the electrochemical sensor, is responded by immediate dispensing/dosing of $H_2O_2$ from a feed tank and by immediate dosing of the active culture of microbes by the microbial dosing system to oxidize sulfides and ammonia produced during treating the refinery waste water.

2. The process for treating the refinery wastewater as claimed in claim 1, wherein the sludge recycling is about 3%.

3. The process for treating the refinery wastewater as claimed in claim 1, wherein the MLSS in the aeration tank is 1000 ppm.

4. The process for treating the refinery wastewater as claimed in claim 1, wherein the polishing of the treated wastewater is carried out in a last chamber of the plurality of chambers of the hybrid packed bed reactor having a modified super hydrophobic and oleophilic foam.

5. The process for treating the refinery wastewater as claimed in claim 4, wherein the modified super hydrophobic and oleophilic foam is selected from the group consisting of polystyrene, polyurethane, polypropylene, expanded polyethylene and ceramic.

6. The process for treating the refinery wastewater as claimed in claim 4, wherein preparing the modified super hydrophobic and oleophilic foam comprises:
   soaking the super hydrophobic and oleophilic foam in 15% hydrogen peroxide ($H_2O_2$) for one hour followed by washing with water;
   soaking in media comprising a mixture of 5% organic silicone and 2% powdered conductive material in water for 2 hours to obtain the modified super hydrophobic and oleophilic foam.

7. The process for treating the refinery wastewater as claimed in claim 6, wherein the organic silicone is polydimethylsiloxane or polymethylhydrosiloxane, and the powdered conductive material is powdered activated carbon, graphite powder, graphene, or carbon nanotubes.

8. The process for treating the refinery wastewater as claimed in claim 4, wherein the modified super hydrophobic and oleophilic foam is arranged in corrugated layers.

9. The process for treating the refinery wastewater as claimed in claim 8, wherein a voidage of the corrugated layers is at least 0.8.

10. The process for treating the refinery wastewater as claimed in claim 1, wherein the pH sensor is connected to a pH controller, wherein the pH controller is configured to maintain the pH in a range of 6.5-8.5 by automatically dosing an acid or a base.

11. The process for treating the refinery wastewater as claimed in claim 1, wherein the dissolved oxygen (DO) sensor is connected to a DO controller, wherein the DO controller is configured to maintain the dissolved oxygen in a range of 5-6 ppm.

12. The process for treating the refinery wastewater as claimed in claim 1, wherein the plurality of chambers of the hybrid packed bed reactor is about 4 to 6 in number and the plurality of the chambers are inter-connected chambers operating in a plug flow mode.

13. The process for treating the refinery wastewater as claimed in claim 1, wherein each of the plurality of chambers, except a last chamber of the plurality of chambers, has a first part and a second part, wherein the first part comprises 75% of volume of each of the plurality of chambers, and the second part comprises 25% of volume of each of the plurality of chambers, and wherein the first part is a packed bed reactor, and the second part is a stirred tank reactor.

14. The process for treating the refinery wastewater as claimed in claim 13, wherein the electrochemical cell is placed in the stirred tank reactor.

15. The process for treating the refinery wastewater as claimed in claim 14, wherein the electrochemical cell is constructed in an open-ended cylinder and is equipped with two electrodes separated by conductive separator.

16. The process for treating the refinery wastewater as claimed in claim 15, wherein the open-ended cylinder of the electrochemical cell comprises acrylic, or polypropylene.

17. The process for treating the refinery wastewater as claimed in claim 1, wherein a second set of sensors are provided when a length of a wall of each of the plurality of chambers is more than 4 meters and when a depth of each of the plurality of chambers is more than 3 meters.

18. The process for treating the refinery wastewater as claimed in claim 1, wherein the first set of sensors and the second set of sensors are placed at a frequency of $4 \times 3$ m$^2$.

19. The process for treating the refinery wastewater as claimed in claim 1, wherein the SOUR sensor is connected to an air sparger and configured to work in association with the DO sensor to maintain the active culture of microbes in in each of the plurality of chambers of the hybrid packed bed reactor.

20. The process for treating the refinery wastewater as claimed in claim 1, wherein the conductivity sensor is configured to monitor conductivity of the refinery wastewater to be treated and to optimize dosage of chemicals to be used to treat the refinery wastewater.

* * * * *